April 11, 1967 N. SHERWOOD 3,313,670
APPARATUS FOR FABRICATING PLASTIC PIPE
Filed Jan. 22, 1963 2 Sheets-Sheet 1

INVENTOR.
NOBLE SHERWOOD
BY
*Andrus & Starke*
Attorneys

April 11, 1967  N. SHERWOOD  3,313,670
APPARATUS FOR FABRICATING PLASTIC PIPE
Filed Jan. 22, 1963  2 Sheets-Sheet 2

INVENTOR.
NOBLE SHERWOOD
BY
Andrus & Starke
Attorneys

United States Patent Office 3,313,670
Patented Apr. 11, 1967

3,313,670
APPARATUS FOR FABRICATING PLASTIC PIPE
Noble Sherwood, Shorewood, Wis., assignor, by mesne assignments, to A. O. Smith Corporation, Milwaukee, Wis., a corporation of New York
Filed Jan. 22, 1963, Ser. No. 253,198
14 Claims. (Cl. 156—359)

This invention relates to a fabrication of reinforced plastic articles and more particularly to an apparatus for fabricating reinforced plastic pipe in which a provision is made for accurately controlling the temperature of the resin during the winding operation.

Pipe or other tubular articles are generally fabricated by winding a tape or web of fibrous reinforcing material impregnated with an uncured thermosetting resin on a mandrel in a series of superimposed layers. After a sufficient number of layers have been formed to provide the pipe with the desired physical properties, the resin is cured to provide a strong, integral structure. In some cases the reinforcing material may be precoated with a partially cured thermosetting resin so that the resin on the tape is in the solid, yet deformable, state. The partially cured resin is then heated as the tape is wound on the mandrel, either by passing the tape over a heated distribution roller or heating the mandrel itself, to melt the resin, and the resin is subsequently cured to bond the layers of tape together as an integral structure.

In manufacturing reinforced plastic pipe by methods of this type, it has been found that variations in the temperature of the melted resin, as it is applied to the mandrel, results in substantial variations in the physical properties of the pipe. For example, if the melted resin is applied to the mandrel at too low a temperature, the resin will not be fluid enough to completely squeeze the air out between the layers with the result that the air entrapment occurs between the wound layers. Conversely, if the resin is at too high a temperature, it will cure too quickly and cross-linking will not occur between the resin in superimposed layers so that a laminated structure may result.

An accurate control of the resin temperature cannot be achieved by measuring the temperature of the distribution roller nor by measuring the temperature of the mandrel due to the fact that slight variations in the speed of winding, changes in the surface condition of the distribution roller or mandrel or atmospheric variations may cause a change in heat transfer from the roller or mandrel to the tape.

The present invention is directed to an apparatus for winding a reinforced plastic pipe in which the temperature of the tape is sensed or measured as it passes from the distribution roller onto the mandrel. More specifically, the tape impregnated with a partially cured, solid resin, passes over a heat distribution roller and the heat from the roller serves to melt the resin. The tape then is wound onto the mandrel in a generally helical pattern. An infrared sensing unit, which measures infrared radiation, is directed toward the portion of the tape passing from the distribution roller to the mandrel and senses the temperature of the tape at that location. The infrared sensing unit is operably connected to the heating element of the distribution roller and as the temperature of the tape increases or decreases, the electrical energy supplied to the heating element of the distribution roller is correspondingly varied to provide a uniform tape temperature.

The apparatus of the invention enables the tape and resin being wound on the mandrel to be at a constant temperature at all times and therefore provides a uniform product with substantially uniform physical properties.

As the unit is responsive to the temperature of the tape as it is being wound on the mandrel, a uniform temperature will be maintained regardless of the speed variations of winding. Moreover, a uniform resin temperature will be achieved even though the surfaces of the distribution roller or mandrel may be coated with dirt, resin or other foreign materials which may cut down the rate of heat transfer to the tape.

Other objects and advantages will appear in the course of the following description.

The drawings illustrate the best mode presently contemplated of carrying out the invention.

Figure 1:
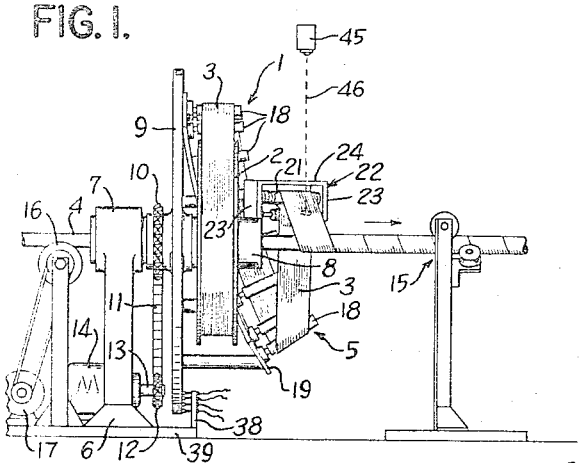
FIGURE 1 is a side elevational view of the apparatus for fabricating a reinforced plastic pipe and constructed in accordance with the present invention.

The drawings illustrate an apparatus for fabricating reinforced plastic pipe or other tubular articles which includes a winding head 1 including a rotatable reel 2 on which a coil of tape 3 is mounted. A mandrel 4 is mounted for movement coaxially within the central opening in winding head 1 and serves to receive the tape as the head rotates and the mandrel is moved axially. The tape 3 is guided onto the mandrel 4 in a generally helical pattern by a guide mechanism 5 which serves to properly guide the tape and impart a selected twist to the tape as the tape moves from the coil on reel 2 to the mandrel 4.

The winding head 1 comprises a base 6 which carries a hub 7. A shaft 8 is mounted for rotation within the hub 7 and the reel 2, as well as a disc or flywheel 9 and are secured to the shaft 8 and rotate with the shaft.

The shaft 8 is rotated by means of a sprocket 10 which is mounted on the shaft and is connected by chain 11 to a sprocket 12 secured to drive shaft 13 of motor 14. The motor 14 is of any suitable variety adapted to establish a constant rotational speed of the disc 9 and reel 2 to maintain a constant withdrawal of the tape 3 from the reel 2 to the mandrel 4.

The mandrel 4 is supported for axial movement within a plurality of roller supports indicated generally by 15. A drive wheel 16 is mounted in driving relation to the trailing portion of the mandrel 4 and a motor 17 is coupled to the drive wheel to continuously drive the wheel at a preselected constant speed. With this construction, the mandrel 4 is moved axially through the winding head 1 at a constant speed for progressively winding the tape on the mandrel.

The tape 3 is formed of a reinforcing material impregnated or coated with an uncured resin. The reinforcing material may take the form of mineral fibers such as glass or asbestos, synthetic fibers such as nylon or rayon, vegetable fibers, animal fibers, metal wire, and the like. The reinforcing material can be in the form of substantially continuous unidirectional fibers, woven fabric, matting, braided tubing, and the like.

The reinforcing material is impregnated with a partially cured thermosetting resin such as an epoxy, polyester, furane, melamine, and the like. The partially cured resin is in a solid, yet deformable, state so that the tape can be readily coiled and guided to the mandrel. As the thermosetting resin is only partially cured, it can be melted or softened by the application of heat.

Epoxy resins have been found to be very satisfactory as the impregnant or coating for the reinforcing material. The epoxy resins can be prepared by condensing a polyhydric phenol with a polyepoxide or polyfunctional halohydrin as disclosed, for example, in U.S. Patent No. 2,801,227. The resulting condensation product is generally a complex mixture of glycidyl polyethers having an epoxy equivalency greater than 2.

The curing agents used to cure the epoxy resin to the rigid infusible state may take the form of 4,4'-methylene dianiline, ethylene diamine, metaphenylene diamine, and the like.

The resin is applied to the reinforcing material in any conventional manner such as dipping, spraying, roller coating, and the like. After the resin and curing agent are applied to the reinforcing material, the resin will begin to cure or polymerize and the curing of the resin is halted at a predetermined stage by refrigerating the tape so that the resin will be in the solid partially cured state and will not be fully cured to the infusible state. The tape can then be wound in coiled form on reel 2 in preparation for the pipe fabricating process.

It is also contemplated that other heat fusible resins, such as thermoplastic resins, can be employed in place of the thermosetting resins. As thermoplastic resins can be readily melted or softened by heat, it is not necessary to maintain the resin in a partially cured condition in the tape as in the case of thermosetting resins.

The guide mechanism 5 for guiding the tape 3 onto the mandrel 4 includes a series of rotatable guide rollers 18 which are mounted on a generally curved support plate 19 secured to disc 9. The guide rollers 18 are circumferentially spaced about the mandrel 4 and the initial take-off roller is mounted generally parallel to the axis of the reel 2. Each succeeding roller 18 in the series is displaced at a slight angle to the adjacent rollers to thereby impart a slight twist to the tape as it moves over the series of rollers 18.

The tape 3 travels from guide rollers 18 over guide roller 20 and over heated roller 21 to the mandrel 4. The rollers 20 and 21 are disposed in substantially parallel relation and are generally parallel to the last roller 18 of the series. The rollers 20 and 21 are mounted for rotation in a frame 22 which includes a pair of side plates 23 connected together by top plate 24. One of the side plates 23 is suitably secured to the outer end of the shaft 8 of the winding head so that the rollers 20 and 21, as well as the guide rollers 18, all rotate about the mandrel with the winding head 1.

Figure 4:
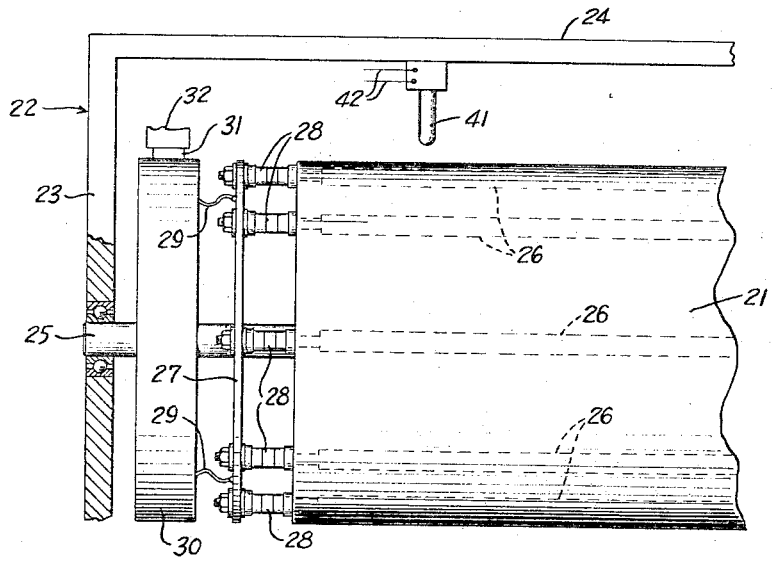
FIG. 4 is a side elevation of the heated distribution roller.

As best shown in FIG. 4, the heating roller 21 is provided with a shaft 25 which is suitably journaled within the side plates 23 of the frame 22. A series of conventional electrical resistance heating elements 26 are disposed within the roller 21 and the terminals of the heating elements are electrically connected to conductor ring 27 by bolt assemblies 28. Leads 29 serve to connect the conductor rings 27 with slip rings 30 which are secured to the shaft 25 on either side of roller 21.

A pair of brushes 31 are mounted in insulated relation within suitable openings in the ends of a conductor bracket 32 and ride on the peripheral surface of each slip ring 30 as roller 21 is rotated about its axis by the tape 3 passing over the roller surface. The bracket 32 is pivotally connected at 33 to the corresponding side plate 23 of frame 22. The brushes 31 are biased inwardly against the peripheral surface of the slip rings 30 by spring loaded arms 34 which are pivotally connected to the outer ends of the conductor bracket 32.

A pair of leads 35 are connected through suitable contacts on the bracket 32 to the brushes 31 and to a pair of concentrically located slip rings 36 on disc 9 in any suitable manner, not shown. A pair of brushes 37 is conventionally mounted in a support bracket 38 which is secured to the bottom plate 39 of the base 6 and locates the brushes in sliding engagement with the slip rings 36. Power leads 40 are connected to the brushes 37.

A temperature sensitive element 41 such as a thermistor is secured to plate 24 and mounted immediately contiguous the roller 21 to establish an electrical signal proportional to the temperature of the roller. Signal leads 42 are connected to the thermistor and to a pair of control leads 43 by a slip ring-brush assembly 44 similar to the previously described slip rings 36 and brushes 37. The control leads 43 are interconnected in the energizing circuit for roller 21 as hereinafter described in connection with FIG. 6 and open the circuit of the power leads 40 in the event the temperature of the roller 21 rises to an abnormal or damaging level.

Figure 2:
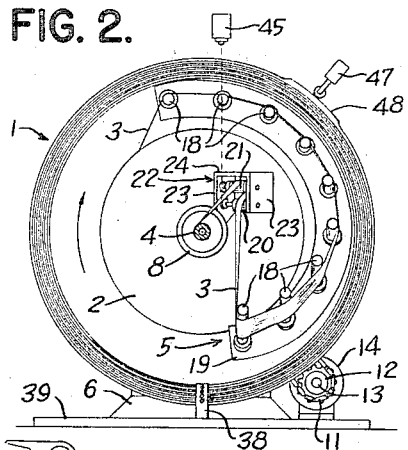
FIG. 2 is an end view of the apparatus shown in FIG. 1.
Figures 3, 5:
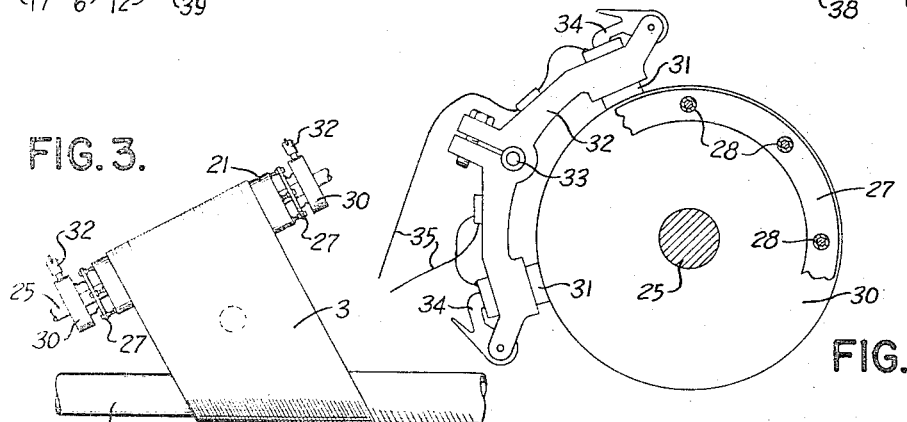
FIG. 3 is a fragmentary top view of the appartus.
FIG. 5 is a transverse section taken along the line 5—5 of FIG. 4.
Figure 7:
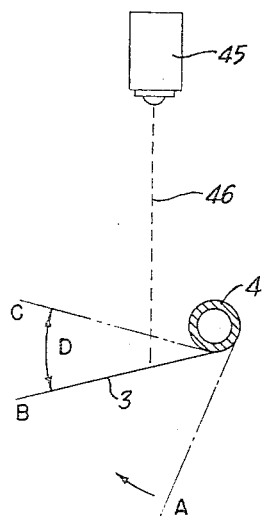
FIG. 7 is a diagrammatic view showing the relation of the heat sensing unit to the tape being wound on the mandrel.
Figure 8:
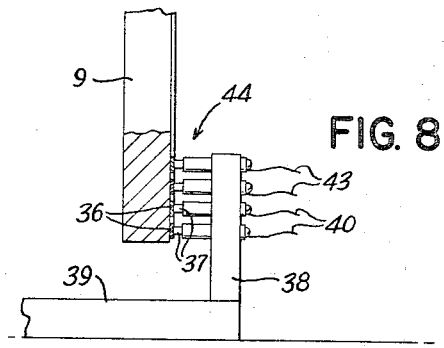
FIG. 8 is an enlarged fragmentary side elevation showing the slip ring connections on the disc.

To accurately control the temperature of the resin on the tape 3 as the tape is being wound on the mandrel, a heat sensing device, such as an infrared sensing unit 45, is employed and is also operably connected in the circuit of the heating elements of rollers 21. As shown in FIGS. 1 and 2, the infrared sensing unit 45 is mounted in a manner so that it is directed along a line which will be crossed by the portion of the tape passing from the distribution roller 21 to the mandrel during rotation of the winding head. As shown in FIGS. 3 and 7, the sensing unit 45 is directed along line 46, and during rotation of the winding head, the portion of the tape passing from the roller 21 to mandrel 4 will intersect line 46 with the result that the unit will sense the infrared radiation or heat of that portion of the tape.

In order that the output of the sensing unit 45 is only effecting during the particular period of rotation of the winding head when the tape intersects line 46, a switch 47 is operably connected in a control circuit with the unit 45. The outer surface of the disc 9 is provided with a raised cam surface 48 which, during a given period of rotation of the disc, will engage and close the switch 47 and thereby operably connect the infrared sensing unit in the control circuit shown in FIG. 6. The cam surface 48 is located so that the switch 47 will be closed during that period of rotation of the winding head when the tape passing between the roller 21 and mandrel 4 passes across line 46. As shown in FIG. 7, during rotation of the winding head the tape approaching the mandrel rotates from position A, indicated by the broken lines in FIG. 7, to the position B. When the tape reaches position B, the switch 47 will be closed by cam 48 to operably connect the sensing unit 45 in the control circuit, and when the tape reaches position C the switch will be opened. Thus, the switch 47 is open only when the tape passes through sector D, which is usually about 10° to 30°.

Figure 6:
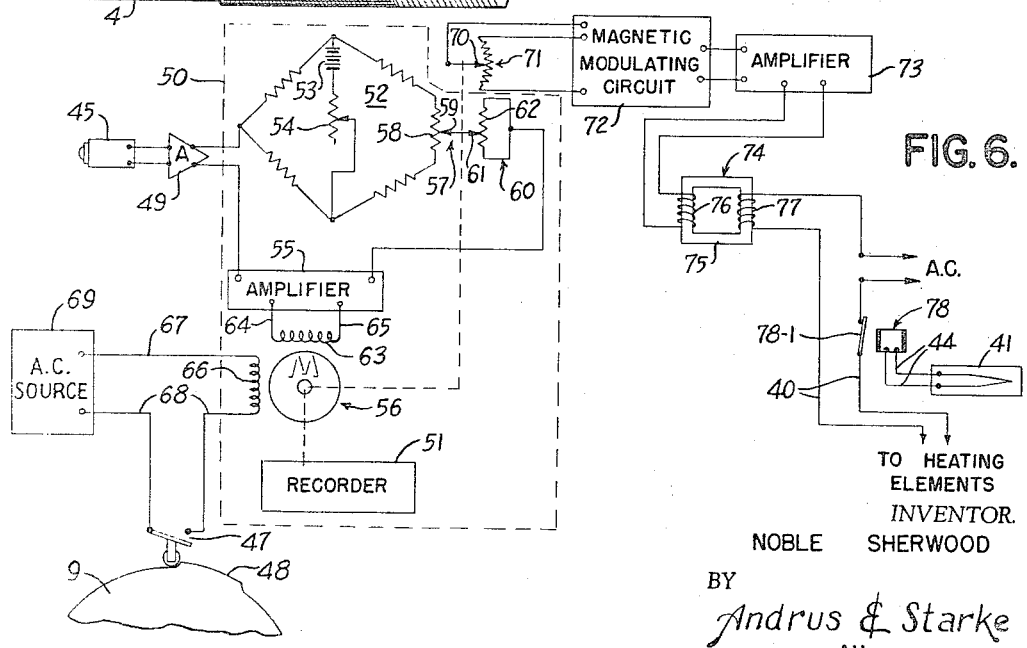
FIG. 6 is a schematic diagram of an electrical sensing and control circuit for controlling energization of the heated distribution roller shown in FIGS. 1-4.

Referring particularly to FIG. 6, a schematic diagram of a suitable control circuit for controlling the energization of the elements of roller 21 is shown. The components are conventional devices and are shown either in appropriately labeled blocks or schematically where necessary to fully explain the circuit functioning.

The radiation sensing unit 45 establishes a small electrical signal which is connected to an amplifier 49 which amplifies the signal to a suitable operating voltage. The output of the amplifier 49 is connected to a recorder-controller 50 having a recorder or indicator 51 to record the temperature variations detected by the radiation sensing unit 45.

The recorder-controller 50 regulates the power supplied to the heating elements of roller 21.

The illustrated recorder-controller 50 is a self-balancing bridge unit having a four-leg resistance bridge 52 with a pair of input junctions connected to a suitable direct current source shown as a battery 53 connected in series with adjustable resistor 54 for setting of the circuit. The output of the bridge 52 is connected in series with the output of amplifier 49 to the input of an amplifier 55 and controls a balancing motor 56. A balancing slidewire potentiometer 57 includes a resistor 58 connected between two legs of the bridge with a movable tap 59 constituting an output terminal. A similar potentiometer 60 includes a tap 61 coupled to the tap 59 and a resistor 62 having the opposite ends connected to the one side of amplifier 55.

The voltage output of bridge 52 and of the sensing unit 45 as amplified by amplifier 49 are connected in opposition and an input is applied to the amplifier 55 in accordance with the difference therebetween to operate motor 56, as presently described. If the output of amplifier 49 is greater, the input to amplifier 55 is of corresponding polarity. Conversely, if the output of the bridge 52 is the greater, the polarity of the input to amplifier 55 is reversed. Amplifier 55 is of any suitable construction adapted to convert the direct current input into a suitable alternating current for operating motor 56. For example, the D.C. input voltages may first pass through a chopper to establish an alternating voltage of a phase related to the polarity of the input.

The self-balancing motor 56 is shown as a two phase reversible induction motor having a first phase or control field winding 63 connected by leads 64 and 65 to amplifier 55 and a second phase or reference field winding 66 is connected by suitable leads 67 and 68 to a suitable alternating current source 69. Switch 47 is inserted in line 68 and limits operation of motor 56 to the period switch 47 is closed and unit 45 is aligned with tape 3. The direction of motor rotation is determined by the relative phase or polarity of the energizing voltage applied to winding 63. In the present invention, the proper phased voltage is established, as more fully described hereinafter, by the opposite polarities of the output of bridge 52 and amplifier 49, the summation of which is impressed on the amplifier 55 and which reverses in polarity with a reversal in the direction of rotation of the motor 56.

Motor 56 is also coupled, as diagrammatically shown, to the slider or tap 70 of a slide-wire or potentiometer 71 which is connected as a part of magnetic modulator control 72 of any suitable construction. A voltage drop exists across the potentiometer 71 and a portion thereof depending on the position of tap 70 forms a part of the output of control 72 and is impressed on a suitable direct current amplifying unit 73. The magnetic modulator control 72 is of any known or suitable construction and is therefore shown in block diagram. A particularly satisfactory unit is commercially available from the Barber-Coleman Company and includes a proportional output in accordance with the setting of tap 70 and also a reset to a predetermined voltage level and a rate of correction control.

The output of amplifying unit 73 is connected to actuate a suitable saturable reactor 74 for regulating the power supplied to the roller 21.

The reactor 74 is diagrammatically shown having a core 75 carrying a D.C. control winding 76 connected to the amplifying unit 73 and an A.C. reactive winding 77 connected in series with power leads 40 and the heating elements of roller 21. The D.C. current in control winding 76 correspondingly saturates the core 75 and thereby varies the reactance of winding 77. The reactance of winding 77 determines the amplitude of the current in the circuit and thereby regulates the heating of roller 21.

In summary, the bridge 52 is set to establish a predetermined output voltage corresponding in magnitude and of an opposite polarity to the voltage signal from the radiation sensing unit 45, corresponding to a preselected tape temperature. Each time the radiation sensing unit 45 is aligned with the predetermined point 46 on the tape, the switch 47 closes and is held closed for a short period during which time the voltage signal from the radiation sensing unit is inserted in the controller 50. If the temperature of the tape 3 decreases, the output of the sensing unit 45 during the next sensing period decreases. A voltage of the polarity of the output of bridge 52 and of an amplitude corresponding to the change in tape temperature is applied to the amplifier 55 and thus to motor 56. The motor 56 is then energized to rebalance the bridge 52 to the preset position and to adjust tap 70 to vary the output of the modulator control 72 during the time the switch 47 is closed.

The variation in the setting of tap 70 is in a direction to increase the D.C. current to reactor 74 and to thereby decrease the A.C. reactance thereof with a corresponding current increase to the roller 21.

If the temperature of tape 3 however increases, the voltage output of sensing unit 3 during a subsequent alignment with tape 3 increases above that of bridge 52. The difference is again impressed on the amplifier 55. However, the polarity of the voltage signal is the opposite of that resulting from the previously described temperature decrease. As a result motor 56 is driven in a reverse direction to again balance the bridge 52 and to decrease the D.C. signal from the modulator control 72 which is fed to the saturable reactor 74. The decreased saturation of reactor 74 results in a greater A.C. winding reactance and reduces the current supply to the heating elements of roller 21 to reduce the heat input to tape 3.

As a result of the above action, motor 56 provides a gradual resetting of the bridge 52 and potentiometer 71 of the magnetic modulator about the preset position. The periodic sensing of the tape temperature and the corresponding operative connection through switch 47 of this output in the control circuit results in a continuous periodic actuation of the saturable reactor 74 and modulation of the energization and heating of the elements of the roller 21 to maintain a constant and desired tape temperature.

A relay 78 includes a set of normally closed contacts 78–1 connected in series in the power leads 40. Relay 78 is shown connected directly to the control leads 44 from temperature sensitive element 41 for direct energization for opening the circuit in the event the roller 21 reaches a damaging temperature. In practice, a suitable amplifying or other control circuit is preferably interposed in the circuit because of the low output of the usual temperature sensitive element. The schematic illustration of FIG. 6 is given for simplicity and clarity of description.

While the description is directed to a winding unit in which the mandrel is mounted coaxially with the coil of tape 3, it is contemplated that any other type of winding system may be employed. Similarly, any other type of tape guiding mechanism can be employed as long as a heating distribution roller is employed, which serves to melt the resin as the tape is wound on the mandrel.

Although a mechanically actuated switch is employed to synchronize the operation of motor 56 with the alignment of the tape 3 and sensing unit 45, any other type of timing control can be employed. Similarly, the infrared sensing unit has been described as illustrative only and may be replaced with any other means which is sensitive to variation in the temperature of the tape as it is wound on the mandrel.

Various modes of carrying out the invention are contemplated as being within the scope of the following claims particularly pointing out and distinctly claiming the subject matter which is regarded as the invention.

I claim:

1. An apparatus for fabricating a reinforced plastic article, comprising a mandrel, a distribution member mounted adjacent the mandrel, means for winding a strip of reinforcing material impregnated with a resin over the distribution member and onto the mandrel in a generally helical pattern, heating means for supplying heat to the distribution member to melt the resin as the strip passes over said member, heat sensing means for sensing the heat of the portion of the strip passing from said distribution member to said mandrel, and means operably connecting said heat sensing means with said heating means to vary the output of said heating means in accordance with the temperature of said strip.

2. The apparatus of claim 1 wherein said last-named means includes signal generating means establishing an electrical signal proportional to the temperature of said portion of the strip, a self-balancing electrical circuit connected in circuit with said signal generating means and having a balancing element and having a control output established in response to predetermined variation in the output of said signal generating means, and drive means to continuously rebalance said circuit in response to the control output and correspondingly vary the output of said heating means.

3. The apparatus of claim 2 including means coupled to said drive means and to said means for winding the strip to operatively enable the drive means only during the period the sensing means is aligned with said portions of the strip.

4. An apparatus for fabricating a reinforced plastic article, comprising a mandrel, a distribution member mounted adjacent the mandrel, means for winding a strip of reinforcing material impregnated with a resin over the distribution member and onto the mandrel in a generally helical pattern, heating means for supplying heat to the distribution member to melt the resin as the strip passes over said member, and means operably connected to said heating means and responsive to the temperature of the portion of the strip disposed between said distribution member to said mandrel for varying the ouput of said heating means.

5. An apparatus for fabricating a reinforcing plastic article, comprising a mandrel, means to advance the mandrel longitudinally, a distribution roller mounted adjacent the mandrel, means for winding a strip of reinforcing material impregnated with a partially cured thermosetting resin over the distribution roller and onto the mandrel in a generally helical pattern, electrical resistance heating means associated with the distribution roller for heating the roller and thereby heating the strip passing over the roller and melting the resin, a heat sensing unit responsive to the temperature of the portion of the strip passing from said distribution member to said mandrel, and means operably connecting said heat sensing unit with said electrical resistance heating means to vary the output of said heating means in accordance with the temperature of said strip and thereby provide a substantially uniform temperature for said portion of the strip.

6. An apparatus for fabricating a reinforcing plastic article, comprising a mandrel, means to advance the mandrel longitudinally, support means for supporting a strip of reinforcing material coated with an uncured resin in coiled form with the coiled strip being disposed coaxially around said mandrel, means for rotating the support means about the mandrel to wind the strip on the mandrel in generally helical form, a guide member carried by the support means and located adjacent the mandrel and disposed to guide the strip onto the mandrel, heating means for supplying heat to said guide member to melt the resin as the strip passes over said guide member, temperature sensing means for sensing the temperature along a fixed line of direction spaced laterally of the mandrel, the portion of the strip passing from said guide member to said mandrel periodically intersecting said line during rotation of said support means, and means operably connecting said temperature sensing means with the heating means to vary the output of the heating means in accordance with the temperature of said portion of the strip.

7. The structure of claim 6 including means for deactivating of said last-named means during the periods when said portion of the strip is out of intersecting relationship with said line.

8. An apparatus for fabricating a reinforcing plastic article, comprising a mandrel, means to advance the mandrel longitudinally, support means for supporting a strip of reinforcing material coated with an uncured resin about the mandrel to wind the strip on the mandrel in generally helical form, a guide member located adjacent the mandrel and disposed to guide the strip onto the mandrel, heating means for supplying heat to said guide member to melt the resin as the strip passes over said guide member, an infrared sensing unit responsive to temperatures along a fixed line of direction extending tangentially of and spaced from the mandrel whereby the portion of said strip passing from the guide member to the mandrel intersects said line of direction as the support means is rotated about the mandrel, and means operably connecting said temperature sensing means with the heating means to vary the output of the heating means in accordance with the temperature of said portion of the strip.

9. The structure of claim 8 and including means responsive to said strip intersecting said line of direction for energizing said last-named means.

10. An apparatus for fabricating a reinforcing plastic article, comprising a mandrel, means to advance the mandrel longitudinally, a distribution roller mounted adjacent the mandrel, means for winding a strip of substantially continuous undirectional fibers impregnated with a solid partially cured thermosetting resin over the distribution roller and onto the mandrel in a generally helical pattern, heating means for heating the distribution roller to thereby heat the strip and melt the partially cured resin, heat sensing means directed toward a location between said distribution roller and the mandrel and responsive to the temperature of the portion of the strip passing from said distribution member to said mandrel, and means operably connecting said heat sensing means with said heating means to vary the output of said heating means in accordance with the temperature of said strip and thereby provide a substantially uniform temperature for said portion of the strip.

11. An apparatus for fabricating a reinforced plastic article, comprising a mandrel, a distribution member mounted adjacent the mandrel, means for winding a strip of reinforcing material impregnated with a resin over the distribution roller and onto the mandrel in a generally helical pattern, heating means for supplying heat to the distribution member to melt the resin as the strip passes over said member, heat sensing means for sensing the heat of the portion of the strip passing from said distribution member to said mandrel, means operably connecting said heat sensing means with said heating means to vary the output of said heating means in accordance with the temperature of said strip, and an overriding control connected to said heating means and responsive to a preselected temperature of the roller to operably disconnect the heating means from the distribution member.

12. An apparatus for fabricating a reinforced plastic article, comprising a mandrel, a distribution member mounted adjacent the mandrel, means for winding a strip of reinforcing material impregnated with a resin over the distribution roller and onto the mandrel in a generally helical pattern, heating means for supplying heat to the distribution member to melt the resin as the strip passes over said member, heat sensing means for sensing the heat of the portion of the strip passing from said distribution member to said mandrel, a self-balancing bridge circuit having an output and a phase responsive motor, said heat sensing means and the output of said bridge circuit being connected in series opposition to produce a net control signal, means connecting said net control signal to said motor to operate the same in accordance with the magnitude and polarity of the control signal, a magnetic modulating circuit having a proportional output established by the setting of a control member, said control member being coupled to said motor for positioning in accordance with the net control signal, means responsive to said proportional output to correspondingly vary the output of said heating means in accordance with the temperature of the tape.

13. The apparatus of claim 12 wherein said motor includes a pair of field windings, one of which is a control winding connected to said net control signal and the other is a reference winding, a rapid acting switch is connected in circuit with said reference winding, means responsive to alignment of the tape and the sensing unit to operatively close said switch and thereby restrict motor operation to the period of alignment.

14. An apparatus for fabricating a tubular article, comprising a mandrel, means to advance the mandrel longitudinally, winding head means containing a strip of reinforcing material coated with a binder, means to rotate said winding head means about the axis of the mandrel to wind the strip on the mandrel in generally helical form, heating means for heating the strip before the strip is wound on the mandrel, temperature sensing means for sensing the temperature along a fixed line of direction spaced laterally of the mandrel, the portion of the strip passing from said winding head means to said mandrel periodically intersecting said line during rotation of said winding head means, means operably connecting said temperature sensing means with said heating means to vary the output of the heating means in accordance with the temperature of said portion of the strip, and means responsive to said portion of the strip intersecting said line of direction for energizing said last named means.

References Cited by the Examiner

UNITED STATES PATENTS

| | | | |
|---|---|---|---|
| 2,250,430 | 7/1941 | Wade | 156—431 X |
| 2,828,239 | 3/1958 | Fischer | 156—425 X |
| 3,004,880 | 10/1961 | Lord | 156—64 |
| 3,099,190 | 7/1963 | Allen et al. | 93—80 |
| 3,211,893 | 10/1965 | Barlow et al. | 219—469 |
| 3,245,261 | 4/1966 | Buteux et al. | 73—355 |

EARL M. BERGERT, *Primary Examiner.*

J. P. MELOCHE, *Assistant Examiner.*